C. J. LANG.
FRICTION BEARING.
APPLICATION FILED AUG. 6, 1908.

911,412. Patented Feb. 2, 1909.

Witnesses:
J. M. Shear
Harry J. Blighton

Inventor,
Carl James Lang
Walter McReynolds,
Atty.

UNITED STATES PATENT OFFICE.

CARL JAMES LANG, OF OLEAN, NEW YORK.

FRICTION-BEARING.

No. 911,412.     Specification of Letters Patent.     Patented Feb. 2, 1909.

Application filed August 6, 1908. Serial No. 447,225.

*To all whom it may concern:*

Be it known that I, CARL JAMES LANG, a citizen of the United States residing at Olean, New York, have invented new and useful Improvements in Friction-Bearings, of which the following is a specification, reference being had to the accompanying drawings.

The object of the invention is to provide a simple and practical mechanism whereby friction and tension is produced while the shaft is being revolved.

With the above and other objects in view, this invention consists of the novel features and the combination and arrangement of parts hereinafter described and claimed, and illustrated in the accompanying drawings in which—

Figure 1:
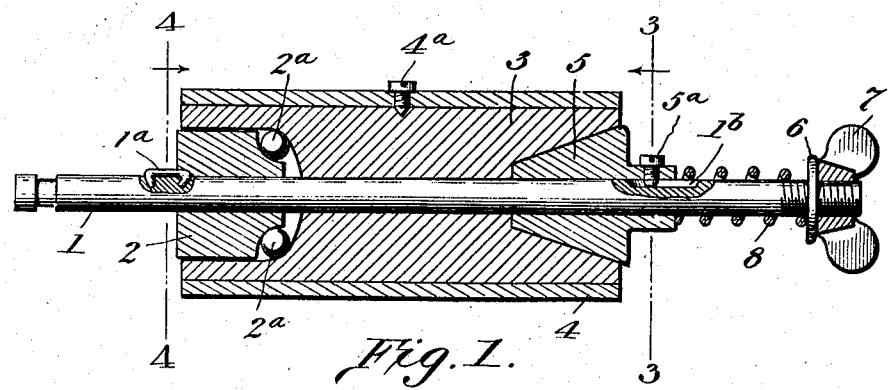
Figure 2:
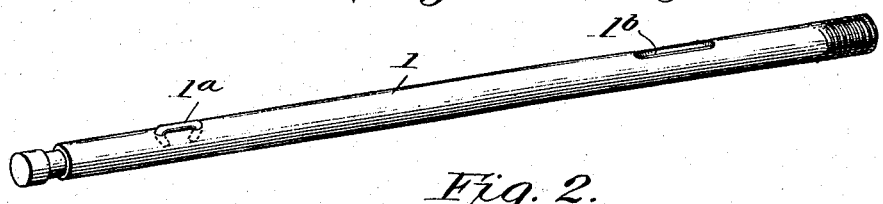
Figure 5:
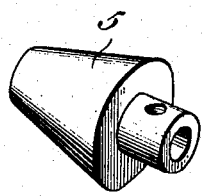
Figure 3:
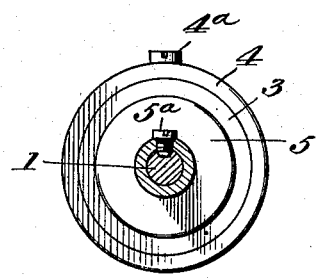
Figure 4:
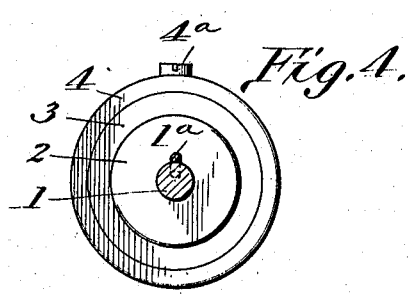

Figure 1 is a longitudinal section of the device. Fig. 2 is a perspective view of the shaft. Fig. 3 is a transverse section taken along line 3—3 of Fig. 1. Fig. 4 is a transverse section taken along line 4—4 of Fig. 1. Fig. 5 is a perspective view of the tapering cone.

In the drawings forming part of this specification, the separate parts of my improvement are designated by the same numerals of reference in each of the views; and these drawings, with the following detailed description, form a full and complete specification, such as will enable those skilled in the art to which it appertains to make and use the same.

In said drawings, 4 denotes any outer casing, hub or journal-box in which my friction bearing may be firmly held by a set screw 4ª, as is clearly shown in Fig. 1.

3 denotes the body portion or stationary member and can be made any size and dimension to fit exactly into said casing, hub or journal-box (4) and firmly held in it. A shaft 1 (of any desired thickness) extends through the center of said stationary member in such a manner that it can revolve freely. A collar or cone 2 is affixed to said shaft (1) and held in position by a staple 1ª, driven into or through said shaft. Said collar or cone (2) is separated from said stationary member or shell (3) which is concaved to form a reciprocal cone, by steel balls 2ª which allows shaft (1) to revolve smoothly and without friction. The other end of said body portion or stationary member is provided with a conical socket or recess in which a tapering cone 5 revolves frictionally. Said tapering cone (5) is slidably affixed to said shaft (1) by a set screw 5ª extending into a slot 1ᵇ in said shaft. Any desired tension may be easily procured, when said tapering cone is pressed against said stationary member or shell (3) by means of a coiled spring around said shaft, adjusted by lock-nut, 6 screwed upon said shaft by means of wings 7.

This device may be advantageously used in winding any substance from one spool or reel affixed to said shaft 1 to another spool or reel for the tension will prevent the momentum from carrying that spool or reel faster than the other; and it also insures uniform tightness throughout. In rewinding moving picture films, it prevents the scratching of the pictures for the tension prevents the looping or bulging of the film when winding swiftly, so common where no friction device is used. This latter is the principal use for which this device is intended and for which I desire Letters Patent.

Having thus described my invention, what I claim as new is:

1. A friction bearing consisting, in the combination described, of a shaft, a cone, a shell body, a tapered cone and means by which said tapered cone is frictionally pushed against said shell.

2. The combination of a stationary shell, firmly holding a shell body, having a hole through its center, a shaft revolving through it, a cone affixed thereon and separated from said shell body by steel balls; and a cone shaped member, slidably affixed to said shaft and tensionably held against said shell body by a resilient member, and adjusted by a lock-nut screwed upon said shaft.

In testimony whereof I hereunto affix my signature in the presence of two witnesses.

CARL JAMES LANG.

Witnesses:
    P. A. DAVIDSON.
    OLIVER L. HAIGHT.